US011745105B2

United States Patent
Ciganko et al.

(10) Patent No.: US 11,745,105 B2
(45) Date of Patent: Sep. 5, 2023

(54) INTERACTIVE ANIMATRONIC GAME/DEVICE PARTNER AND METHOD FOR USING SAME

(71) Applicant: Huge Play Inc., Chandler, AZ (US)

(72) Inventors: David John Ciganko, Chandler, AZ (US); Kevin B Mowrer, Barrington, RI (US)

(73) Assignee: HUGE PLAY INC., Barrington, RI (US)

( * ) Notice: Subject to any disclaimer, the term of this patent is extended or adjusted under 35 U.S.C. 154(b) by 14 days.

(21) Appl. No.: 17/407,126

(22) Filed: Aug. 19, 2021

(65) Prior Publication Data

US 2022/0054941 A1    Feb. 24, 2022

Related U.S. Application Data

(60) Provisional application No. 63/067,655, filed on Aug. 19, 2020.

(51) Int. Cl.
*A63F 13/533*  (2014.01)
*A63F 13/79*  (2014.01)
(Continued)

(52) U.S. Cl.
CPC ............ *A63F 13/533* (2014.09); *A63F 13/79* (2014.09); *A63H 3/003* (2013.01); *A63H 3/365* (2013.01); *A63H 3/48* (2013.01); *A63H 11/00* (2013.01); *G06N 20/00* (2019.01); *A63H 2200/00* (2013.01)

(58) Field of Classification Search
None
See application file for complete search history.

(56) References Cited

U.S. PATENT DOCUMENTS 5,636,994 A    6/1997  Tong
6,012,961 A    1/2000  Sharp et al.
(Continued)

OTHER PUBLICATIONS

Staines et al. "Morality Play: A Model for Developing Games of Moral Expertise". Sage Journals, Games and culture, 2017. Retrieved on Feb. 11, 2021, from <URL: https://philpapers.org/archive/STAMPA-5.pdf>.

(Continued)

*Primary Examiner* — Jason T Yen
(74) *Attorney, Agent, or Firm* — KENEALY VAIDYA LLP

(57) ABSTRACT

A gaming partner can include a body having a head shaped portion and at least one display unit configured to resemble an eye of the character. At least one motor can be located in the body and configured to move a portion of the head shaped portion. A speaker and a microphone can also be associated with the gaming partner. A processor located adjacent the body can be configured to receive trigger information from a gaming/streaming device and/or a separate server. The processor can also be configured to output a signal to at least one of the display unit, the motor, the speaker, and the microphone in coordination with the trigger information such that a user receives information, such as a critique, related to the game in real time based on the signal to the at least one of the display unit, motor, speaker, and microphone.

18 Claims, 6 Drawing Sheets

(51) Int. Cl.
  *A63H 11/00* (2006.01)
  *A63H 3/36* (2006.01)
  *A63H 3/48* (2006.01)
  *G06N 20/00* (2019.01)
  *A63H 3/00* (2006.01)

(56) References Cited

U.S. PATENT DOCUMENTS

| | | | |
|---|---|---|---|
| 6,075,195 | A | 6/2000 | Gabai et al. |
| 6,773,344 | B1 | 8/2004 | Gabai et al. |
| 8,033,901 | B2 | 10/2011 | Wood |
| 8,414,349 | B2 | 4/2013 | Boman et al. |
| 8,545,335 | B2 | 10/2013 | Fiegener et al. |
| 8,821,209 | B2 | 9/2014 | Fong et al. |
| 8,864,589 | B2 | 10/2014 | Reiche |
| 9,126,122 | B2 | 9/2015 | Boeckle |
| 9,381,430 | B2 | 7/2016 | Reiche et al. |
| 9,433,867 | B2 | 9/2016 | Leyland |
| 9,547,871 | B2 | 1/2017 | Bala et al. |
| 9,604,135 | B2 | 3/2017 | Leyland |
| 9,649,565 | B2 | 5/2017 | Leyland et al. |
| 9,827,502 | B2 | 11/2017 | Leyland et al. |
| 9,833,695 | B2 | 12/2017 | Yano |
| 9,901,832 | B2 | 2/2018 | Canessa |
| 9,914,055 | B2 | 3/2018 | Reiche et al. |
| 9,937,417 | B2 | 4/2018 | Reiche et al. |
| 10,086,264 | B2 | 10/2018 | Leyland et al. |
| 10,086,302 | B2 | 10/2018 | Boeckle |
| 10,143,919 | B2 | 12/2018 | Nelson et al. |
| 10,238,977 | B2 | 3/2019 | Reiche et al. |
| 10,315,119 | B2 | 6/2019 | Reiche et al. |
| 10,512,850 | B2 | 12/2019 | Judkins et al. |
| 10,561,953 | B2 | 2/2020 | Reiche et al. |
| 10,583,357 | B2 | 3/2020 | Barney et al. |
| 10,610,777 | B2 | 4/2020 | Doptis et al. |
| 10,835,810 | B2 | 11/2020 | Doptis et al. |
| 2003/0109305 | A1* | 6/2003 | Gavin ............... A63F 13/5375 463/31 |
| 2003/0198927 | A1 | 10/2003 | Campbell |
| 2005/0148279 | A1 | 7/2005 | Maa |
| 2007/0253580 | A1* | 11/2007 | Sutton ............... A47G 9/1045 381/124 |
| 2009/0291764 | A1 | 11/2009 | Kirkman et al. |
| 2010/0093434 | A1 | 4/2010 | Rivas |
| 2011/0021109 | A1 | 1/2011 | Le et al. |
| 2011/0159963 | A1 | 6/2011 | Link |
| 2011/0177753 | A1* | 7/2011 | Irmler ............... A63H 3/40 446/392 |
| 2011/0269365 | A1* | 11/2011 | Goff ............... A63H 3/28 446/72 |
| 2011/0269366 | A1* | 11/2011 | Sugimoto ........... A63H 33/003 446/72 |
| 2012/0295699 | A1 | 11/2012 | Reiche |
| 2014/0038489 | A1 | 2/2014 | Sharma et al. |
| 2014/0179197 | A1 | 6/2014 | Bradley |
| 2014/0179446 | A1 | 6/2014 | Zuniga et al. |
| 2015/0065258 | A1 | 3/2015 | Meade |
| 2015/0336017 | A1 | 11/2015 | Boeckle |
| 2016/0158659 | A1 | 6/2016 | Pradhan et al. |
| 2016/0166927 | A1 | 6/2016 | Leyland et al. |
| 2016/0361663 | A1* | 12/2016 | Watry ............... H04L 67/10 |
| 2018/0111046 | A1* | 4/2018 | Roberts ............... A63F 13/25 |
| 2018/0117479 | A1 | 5/2018 | Coolidge et al. |
| 2020/0330857 | A1 | 10/2020 | Barney et al. |

OTHER PUBLICATIONS

International Search Report and Written Opinion of the International Search Report for PCT/US2021/046794 dated Dec. 17, 2021.

* cited by examiner

INTERACTIVE ANIMATRONIC GAME/DEVICE PARTNER AND METHOD FOR USING SAME

RELATED APPLICATION DATA

This application claims priority under 35 U.S.C. § 119 to U.S. Provisional Patent Application Ser. No. 63/067,655 filed Aug. 19, 2020, the entire disclosure of which is hereby incorporated by reference.

BACKGROUND

The disclosed subject matter relates to an interactive animatronic gaming/device partner. More particularly, the present disclosure relates to a free-standing robotic/animatronic character that can interact with a user, alone, and while playing certain gaming or other types of apps and streaming devices. The present disclosure relates to a gaming friend platform. In addition, the disclosed subject matter relates to an interactive animatronic gaming partner and method for using the gaming partner in which the gaming partner is not required to be configured with an associated game or streaming device during development, and can instead be taught to interact with any gaming, video, streaming, or other platform through the use of triggers that are received by the gaming partner in various manners.

SUMMARY

Some embodiments are directed to an interactive animatronic character gaming partner, that can include a body including a head shaped portion; at least one display unit located at the head shaped portion and configured to resemble an eye of the character; at least one motor located in the body and configured to move a portion of the head shaped portion to change a structural configuration of the head shaped portion in order to emulate an emotional characteristic for the character; at least one speaker located adjacent the body; at least one microphone located adjacent the body; a processor located adjacent the body and configured to receive trigger information from a gaming device on which a user is playing a game, the processor also configured to output a signal to at least one of the display unit, the motor, the speaker, and the microphone in coordination with the trigger information such that a user receives information related to the game in real time based on the signal to the at least one of the display unit, the motor, the speaker, and the microphone.

Some embodiments are directed to a method for operating an interactive animatronic character gaming partner, that can include providing an animatronic body including a head shaped portion having at least one display unit located at the head shaped portion and configured to resemble an eye of the character, and at least one motor located in the body and configured to move a portion of the head shaped portion to change a structural configuration of the head shaped portion in order to emulate an emotional characteristic for the character, and a processor located adjacent the body and configured to obtain information from a gaming device on which a user is playing a game; causing the processor to receive trigger information from at least one of the gaming device and a separate server, related to an event occurring in the game; changing at least one of, a structural configuration of the head shaped portion, a display from the display unit, and an audible message from a speaker based on the trigger information received by the processor from at least one of the gaming device and the separate server.

Some embodiments are directed to an interactive animatronic character device partner, that can include: a body including a head shaped portion; at least one motor located in the body and configured to move a portion of the head shaped portion to change a structural configuration of the head shaped portion; at least one speaker located adjacent the body; a processor located adjacent the body and configured to interact with a device being used by a user, the processor also configured to receive trigger information from a server that is separate from and configured to communicate with the device, and to output a signal to at least one of the motor and the speaker in coordination with both the trigger information and information related to a first action by the user on the device, such that the gaming partner provides a critique of the first action to the user.

Handheld and tablet devices have become the go-to devices to play interactive gaming apps. Interactive gaming apps have grown exponentially in the past few years. These apps range from casual gaming to multi-player experiences. These app games have variable levels of difficulty and appeal to a wide age range and gender demographics. As in any game situation, encouragement, criticism, and smack-talk are all part of group play. Many of these games feature current, well known character Intellectual properties, which enhance the game experience by contributing unique styles and personalities.

One aspect of the platform is made up of a free standing, plush (or alternative materials), audio animatronic character. This character responds to body positioning (i.e., turning upside down), voice commands, and touch inputs (i.e., stroke, poke) from user; in turn, giving full facial and head expressions driven by internal motor movements. For example, eyes, eyebrows, mouth, ears, and head movements are sequenced to certain verbal responses from the character through internal audio speaker. Internal software program drives motors and audio responses moving those features. Content resides both on product but also downloaded from cloud server. Information is one way and only resides on product. Another aspect of the present disclosure is directed as to when the character figure is played/paired with a digital gaming app. All the aforementioned features exist; however, the character now becomes a "ride-along" participant in the game. As the app game unfolds, the character responds by verbally calling out accomplishments, questions player's decisions, forewarns of action game moves, and adds commentary as the user plays, building a narrative for the game. As per above, the character is always functioning in full audio animatronic mode during game play. The character is paired via a Bluetooth connection, and the gaming app has embedded "triggers" that send information in real time that will illicit verbal response and animatronic movements from character as user plays the game. Content is pulled from a cloud-based server and resides in the product only.

As with the aforementioned aspects of the present disclosure, the underlying software is designed as such to recognizes various tactile, voice, positional, and digital app triggered inputs and pulls down responses to character through a predesigned cloud content library. The software content library is designed to also know time, date, time of day, temperature, general location, historic/current events, and temporal events (i.e., rain, snow) and in certain instances deliver voice comment through product also triggering animatronics.

Another aspect of the present disclosure is the inclusion of a specifically designed user app. This app is intended to facilitate pairing the character product with digital gaming apps, and any future connected products, which will include selling & advertising any new games/products, and suppling analytics to both user and developer.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

Figure 1A:
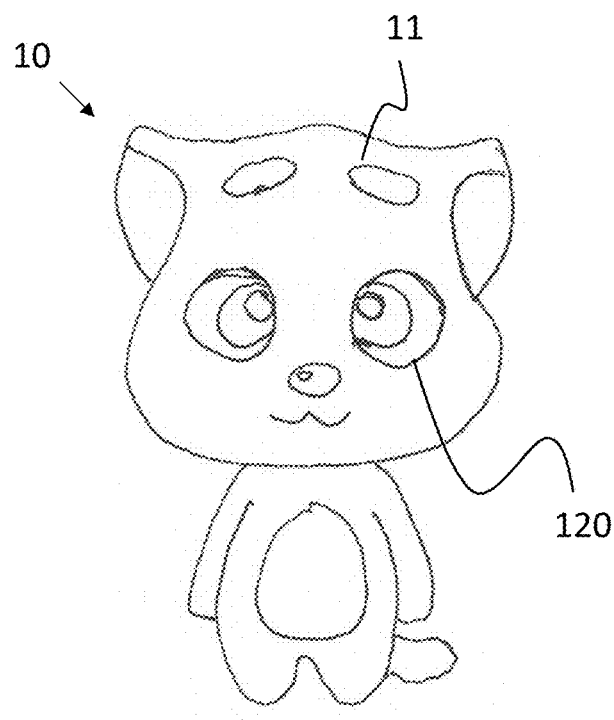
FIGS. 1A-1D are front views of separate embodiments of a game/device partner made in accordance with principles of the disclosed subject matter.

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

FIGS. 1A-D and 2 show examples of a gaming/device partner 10 that includes a soft, plush or other material character, approximately 9-12 inches in height, that either stands or sits and has multiple points of animatronics in head with facial movements/expressions. Internal to the body/gaming partner 10 for example are motors 160, electronics 30, 32, speaker(s) 140, rechargeable battery 72 and touch/motion switches 36.

Figure 4:
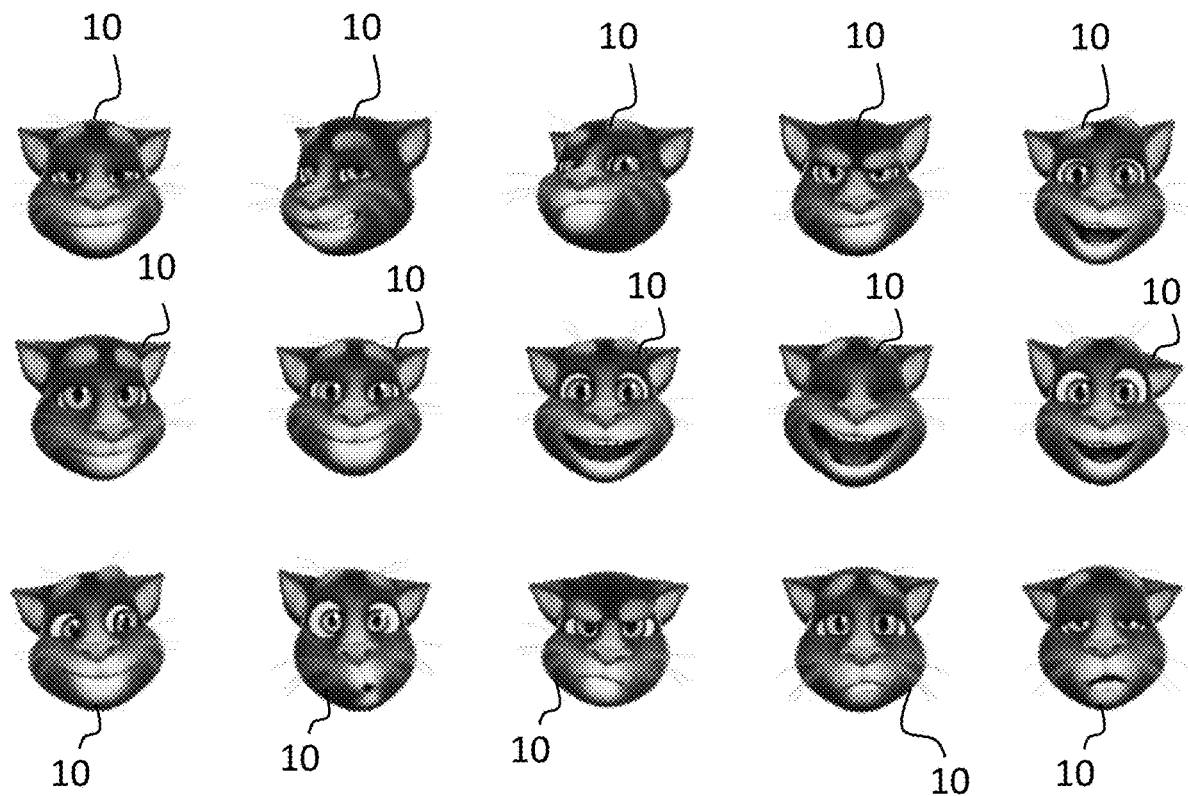
FIG. 4 is a series of front views of a game/device partner showing different structural/emotional configurations of the head portion and made in accordance with principles of the disclosed subject matter.

Unique placement of motors, gears, and attachments activated from predetermined combinations driven from software, create multiple life-like expressions as character talks and responds to voice/touch/app activity. These actions are shown as examples of moving eyes 12, ears 19, eyebrows 16, head 11, and mouth 14 through expressions, as well as, talking mouth motions. FIG. 4 shows examples of facial gestures that can be created by animatronic motors beneath and attached under the "skin" of the body and/or head shaped portion 11 of the gaming partner 10. These facial gestures are shown only as examples and actual gestures will depend on character used in product and particular application.

Figure 3:
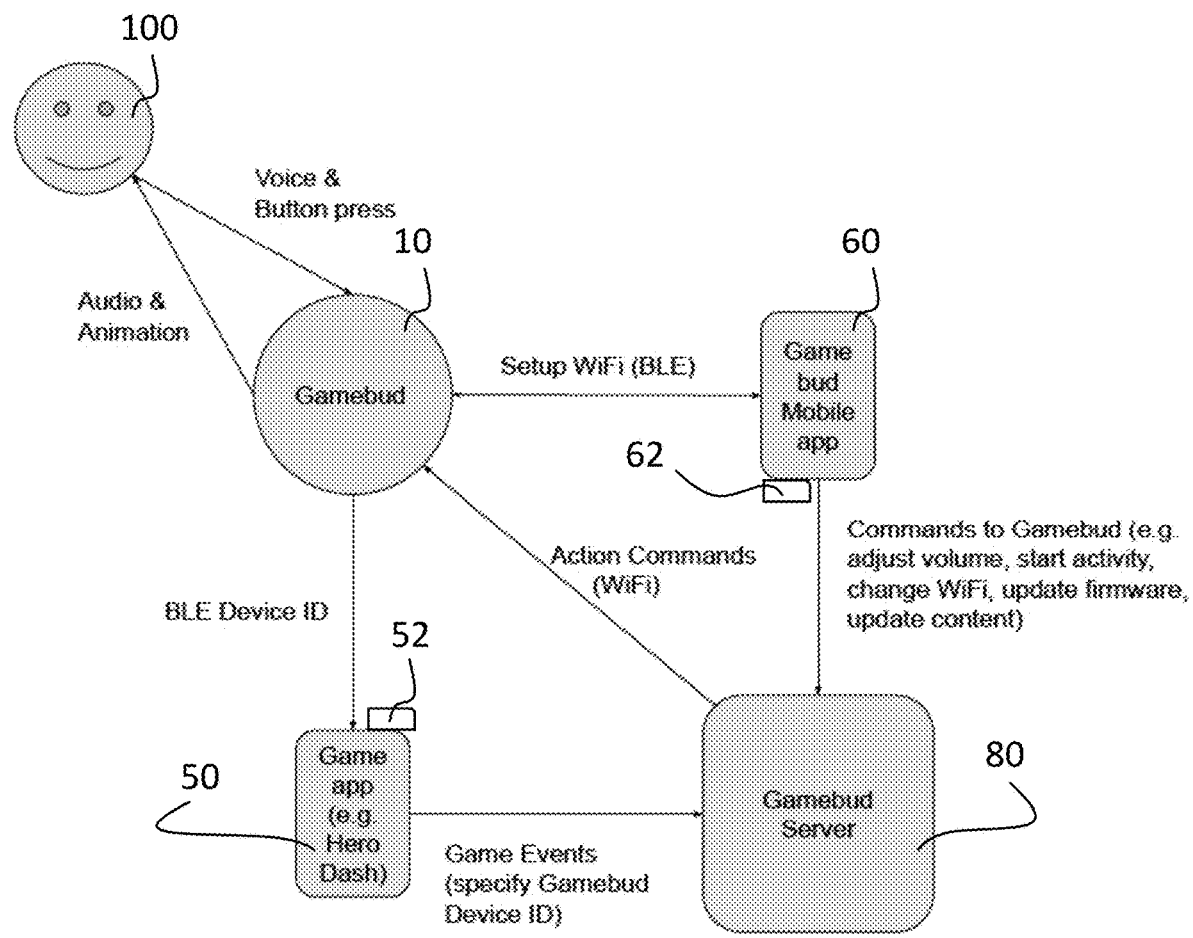
FIG. 3 is a block diagram of an embodiment of a game/device partner made in accordance with principles of the disclosed subject matter.

FIG. 3 is a schematic block diagram showing an example of an animatronic figure gaming/device partner 10 (e.g., game bud) adjacent to a Bluetooth connected device 50 such as a gaming device. In this example, the device is a separate standalone gaming device, but in other embodiments the device 50 can be a cell phone, video device, streaming device or other device with which a user interfaces. For example, the interactive connected game/device partner 10 can pair with any Bluetooth enabled device that plays compatible gaming apps. As the game is being played "trigger signals" embedded in the game app are sent to the stand-alone game/device partner 10 with current or soon to occur events in the game. The software in the game/device partner 10 pulls from a library of facial/head movements, dialog, etc. located in memory 32 to bring the game/device partner 10 to life via processor 30 as the game or device is played. Comments from the character might be "Look out for that obstacle, jump!" or "Wow, you totally missed that opportunity dude!" or "Man, I could have done that blindfolded!"

Since the software knows what the game is about, the game/device partner 10 helps tell a narrative story that enhances the game experience.

FIGS. 1A-D and FIG. 4 show illustrative examples of a plush animatronic character game/device partner 10 and a selection of his facial expressions. Those expressions are reproduced through a series of motors commanded by internal software and often accompanied by the character's voice played through internal speakers housed within body of the game/device partner 10, dependent on inputs from user (speech recognition, tactile/motion behavior). Each expression is driven from a predetermined sequence of motors within the head. Example: scratch the top of the head, a sensor embedded recognizes tactile input and sequence of closing eyes and audible purring occurs or if the user says "hello" the character will respond in multiple ways with facial expressions, mouth movement, and audio. Stand-alone character is connected to cloud server via Wi-Fi. The character product contains, among other things, a processor unit, multiple motors, internal gearing, voice recognition software, microphone, speaker, rechargeable batteries and accompanied charging cable.

FIG. 3 depicts the game/device partner 10 alongside a user 100 who is playing a paired qualified gaming app, for example, on a cellphone. The above mentioned actions can occur during the gameplay in response to preprogrammed digital "trigger" occurrences in the gaming app. A separate app (provided) establishes (via Bluetooth), game connections and amongst other features also captures analytics, helps in pairing of new games, cross selling new games, and compatible new products, as well as provides purchase store.

Operational Experience:

Stand-alone figure can be, amongst other means, activated by touching top of head. Once activated, the character software is looking for tactile inputs, voice commands, or when paired with gaming app, "triggers", to respond to. As user plays game app, the character responds in multiple audio animatronic ways, driving ideas and changes from the game player. All play modes respond with voice and animatronic movements. System software is designed to apply to various character IP properties when animatronic movements and character embodiments are created as separate product.

The audio-animatronic, AI game-connected personality comes to life and interacts with gameplay in real time. In one embodiment, there are three modes of play (however, there may be more).

Gameplay—Once connected to WiFi via the Pairing App, certain (coded) games can be played and during this gameplay the character game/device partner 10 responds to user's actions, warns of events coming up, coaches, congratulates, serves up funny smack, etc. He serves as a contemporary gaming streamer as the user 100 plays the game or otherwise interfaces with the device 50 or mobile device 60.

Freeplay—When a game is not detected the character will initiate conversations via head push activations, stories, activities, facts, time related events, weather events, days in history, gaming lore etc. Some stories and activities allow the character to ask for predetermined voice response to branch stories or activities.

Soundboard—On a Pairing App, there can be several features which control what the product says. The Soundboard can be called up by the user to a series of screens that have buttons labeled with text. User taps on their choice of text and the product immediately voices that dialog. For example, tapping the emotion category and then laugh button makes the character laugh in many ways. Continual pressing the laugh button elicits several different responses.

The head portion 11 of the game/device partner 10 can have features that create an animated responses to digital games, story and activity audio as well as voice input. Features such as ears, eyebrows, mouth, or other features can be caused to move via motors. The eyes 12 can include LCD displays that are programed to move in different states during all play and at times eyes go into full graphic animation that includes video, text, icons, etc.

Mouth—Soft material i.e., molded silicone, within face or muzzle can be used to define the game/device partner 10 mouth 14. A "finger" or tab under (or in slot) of mouth material can be attached to servo or other motor in such a way that as the tab moves up and down it causes various expressions of mouth 14. Driving tab up and down via motor causes mouth to open and close and can be synced to audio through firmware giving life like movement. Driving tab down can cause the soft silicone mouth 14 to open as if in smile gesture and driving tab upwards can cause the mouth to form a frown ("grumpy") gesture.

Eyes 12—One or two displays 120 (such as LCD panels) can be used for eyes 12. Each eye 12 can include full animations and can be synced with mouth 14 movements via firmware/software. A lens 122 such as a molded clear plastic lens can be mounted in front of the LCD panel displays 120 in such a way to optically enlarge the animations from the LCD screens. While the product is on, eyes can be constantly moving, blinking in a natural state. At certain times, the eyes 12 can change to unique full color animated segments, icons, or videos i.e., exclamation marks appear and pulse or hearts appear and pulsate. Ears 19 & Eyebrows 16—Individual ears 19 and eyebrows 16 can move together via linkage 162 such as gearing and motors 160 that are synced with mouth 14 and eye 12 animations via firmware/software.

Pairing App. A Pairing app 12 allows for: Unique product identification number to be paired with the app; allows user to connect to WiFi in order to play and respond to digital games. Product will work with all digital devices, PC gaming and all counsels. Sets up user location in order to bring time relevant content to product. Allows user to pick language and age responses of character. For example, younger less complex verbiage or more complex gaming language and terms can be selected or determined by the app. The app can also feature a unique soundboard that allows user to choose what dialog the character repeats.

Content. There may be a limited amount of content held in memory 32 of the product to reduce memory requirements and ensure data protection, such as start up phrases, shut down phrases, and other set up dialog. Once product is first played with, content can be drawn down from the cloud server and will stay on product until next update. If the user 100 does not have the product connected to WiFi, the last played content will remain on the product, and the user 100 can still be in free play mode. As game app is played, key events are tagged in the gaming app. The software knows ahead of time where these events are and draws down the correct audio response, ear eyebrow, mouth and LCD animation sequence, changing on the fly. In the free play mode (not connected to WiFi) when the user 100 activates the product (e.g., pushing down on head switch) the gaming/device partner 10 can choose an activity such as a comment, story, gaming lore, etc., to talk about or provide animated reaction to.

Certain stories and activities in free play allow for the game/device partner 10 to ask for a predetermined word or phrase response from the user. This speech recognition is designed to branch stories and activities seamlessly. Because there are various outcomes via branching, the stories, and activities, once played, are tagged and transferred into the Pairing App so the user can call up and replay and interact again.

FIG. 1A depicts an embodiment of a game/device partner 10 in which the eyes 14 can be configured via a lens 122 over an LCD. The processor 30 has determined, based on a trigger received from a server 80 (or possibly a device 50 in certain embodiments) and information stored in a memory 32 of the game/device partner 10 that the eyes 12 should be configured under a first mode in which the eyes 12 are depicted as human-like eyes with a content look and intermittent blinking.

Figure 1B:
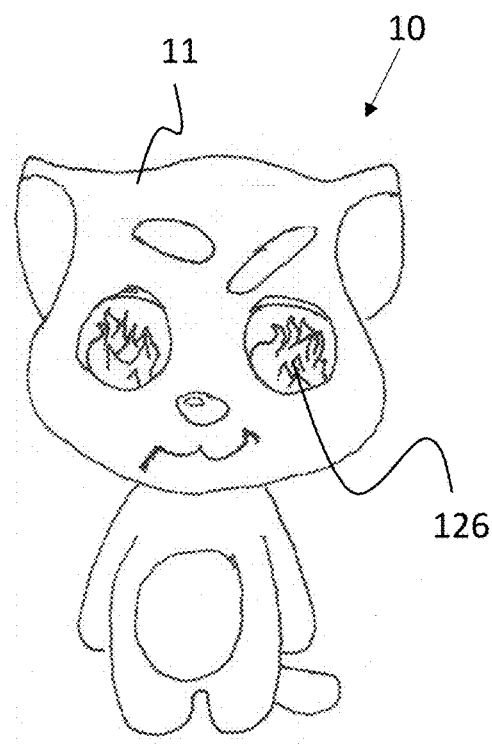

FIG. 1B depicts an embodiment of a game/device partner 10 in which the processor 30 has determined, based on a second trigger that is identical to the first trigger received from the server 80 (or possibly a device 50 in certain embodiments) and information stored in the memory 32 of the game/device partner 10 that the eyes 12 should be configured with video content including flames to give the user an indication that the game/device partner 10 is upset and possibly angry with the an action that caused the second trigger. Although the first and second triggers are identical, the game/device partner 10 takes different actions based on Artificial Intelligence (AI) software located on the processor 30 and information related to the first trigger and first response stored in the memory 32.

Figure 1C:
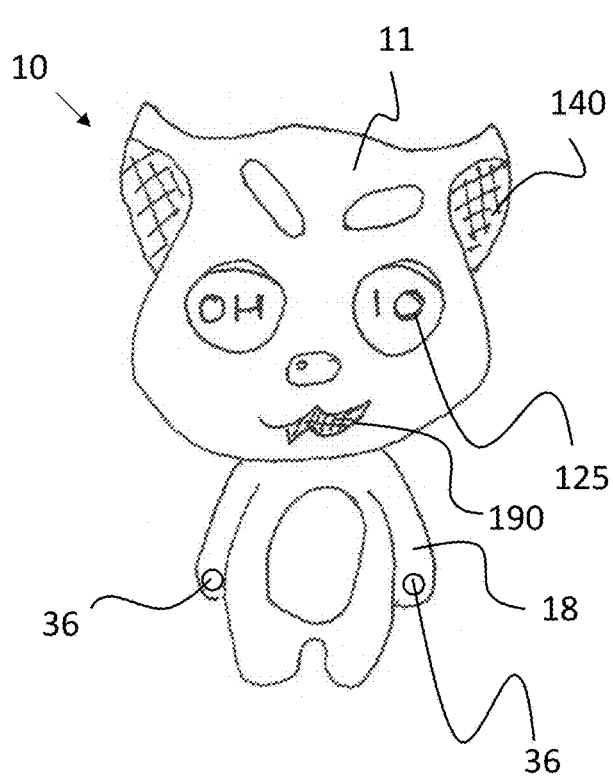

FIG. 1C depicts an embodiment of a game/device partner 10 in which the processor 30 has determined, based on a third trigger that is different from the first trigger received from the server 80 (or possibly a device 50 in certain embodiments) and information stored in the memory 32 of the game/device partner 10 that the eyes 12 should be configured with text content. The third trigger can be, for example, an indication that a football game is being streamed on the device 50. Subsequent triggers can change the text shown by the eyes 12 or return the eyes to resemble a human eye in a home setting or control motors 160, speakers 140, or microphone 190 of the game/device partner 10. The AI can be configured to take information received from the microphone that indicates whether the user or roommates are fans of a particular team, are upset by a certain play, or whether their favorite team has won. Thus, the AI can create its own triggers as it learns the behavior of the user in response to preset triggers.

Figure 1D:
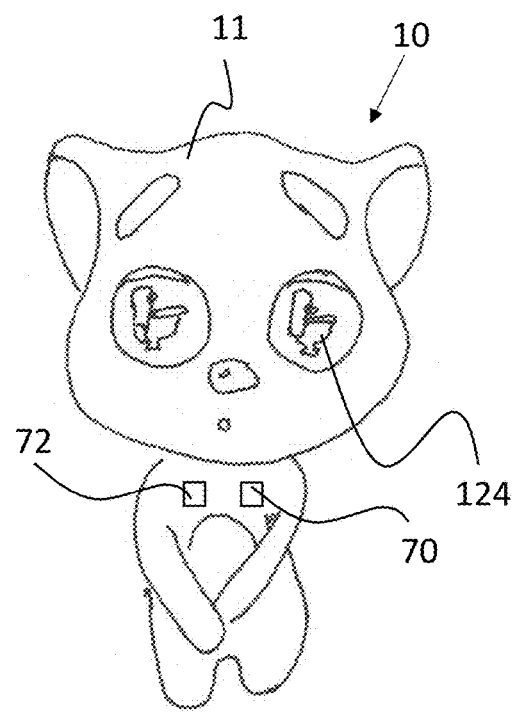

FIG. 1D depicts an embodiment of a game/device partner 10 in which the processor 30 has determined, based on a fourth trigger received from the server 80 (or possibly a device 50 in certain embodiments) and information stored in the memory 32 of the game/device partner 10 that the eyes 12 should be configured with an icon, such as a toilet in the case where the trigger might indicate that the user 100 needs a break, or has been playing too long, or has just encountered an uncomfortable situation in the associated device 50. Any of the triggers can change the icon, text, video shown by the eyes 12, or return the eyes to resemble a human eye in a home setting, or control motors 160, speakers 140, or microphone 190 of the game/device partner 10.

Figure 2:
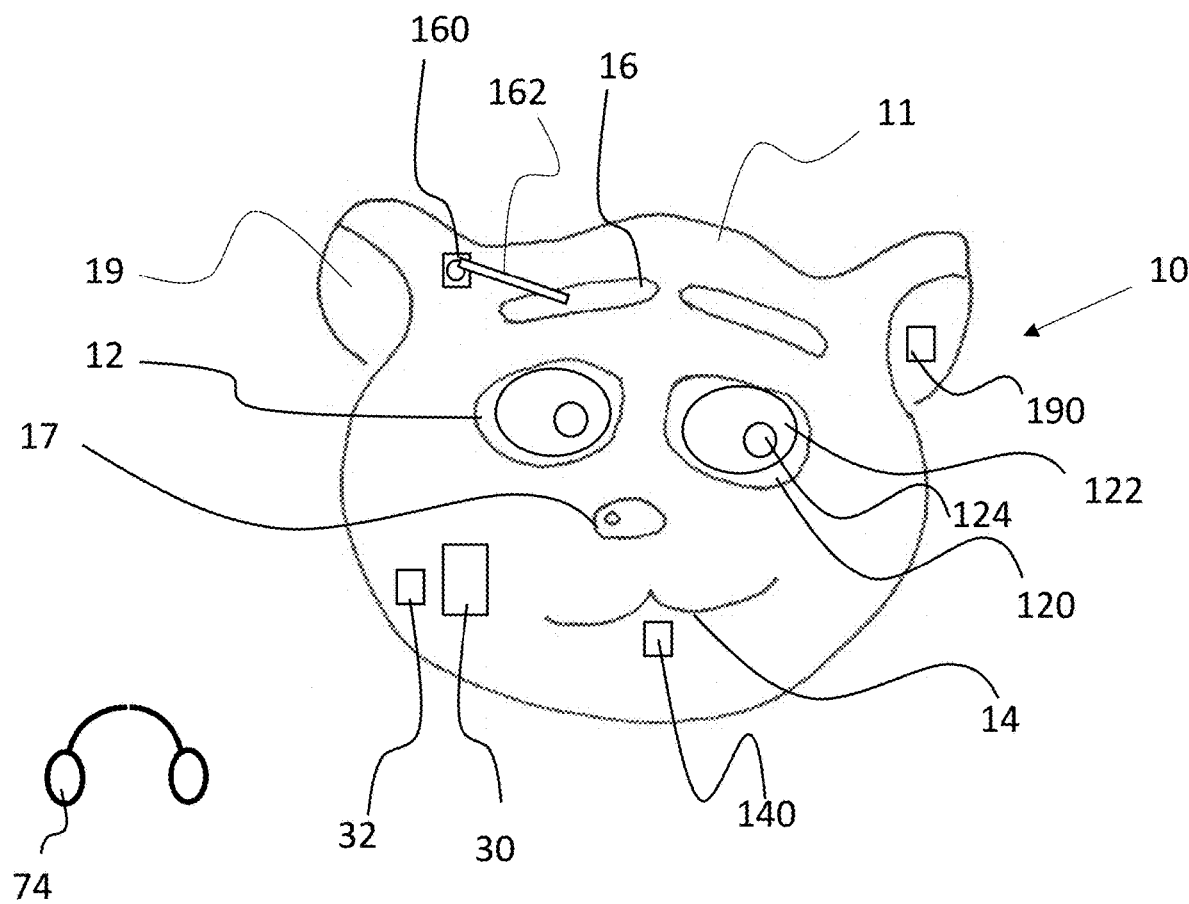
FIG. 2 is a front view another embodiment of a game/device partner made in accordance with principles of the disclosed subject matter.

FIG. 2 schematically depicts another embodiment of a game/device partner 10 in which the head portion includes eyes 12, ears 19, a mouth 14 and a nose 17. The processor 30 and memory 32 can be located within the body of the game/device partner 10. A motor 160 and linkage 162 can be operated based on a signal received from the processor 30 to move various structures, such as eyebrows 16 and other components, to contort the body of game/device partner 10 into various states of emotion (as shown in more detail in FIG. 4.). A speaker 190 can be located in the ears 19 and a microphone 140 can be located in the mouth 14 in this embodiment but can be arranged differently. For example, speaker 190 can be located in the mouth 14 and a microphone 140 can be located in the ears 19 in the embodiment depicted in FIG. 1C. Similarly, the motor(s) 160 and linkage such as gears or connecting rods can be connected to other components such as the mouth 14, ears 19, arms 18, nose 17, eyes 12, etc. In addition, the speaker 190 and microphone 140 can be located in a headphone 74 for use by the user 100.

FIG. 3 is a block diagram of an example of a manner in which components of the game/device partner 10 can communicate and work together. In this embodiment, the user 100 can operate the game/device partner 10 on command through use of buttons or switches 36 on the body of the game/device partner 10 or via a command set up via an app on a mobile device 60. The mobile device 60 can be a tablet, cell phone, or other communication interface that communicates via wireless connection (e.g., wifi, Bluetooth) to the game/device partner 10.

The device 50 on which the user 100 is interfacing with can be a personal computer (PC), cell phone, gaming device, or other streaming or video device. When the device 50 is a PC, for example, an over the top application 52 can be used to communicate to a server 80 that is separate and physically spaced from the device 50. The over the top application 52 acts to more efficiently sort out and categorize triggers that are output by the device 50 while the user is engaged with the device 50. Thus, only triggers relevant to the game or content in which the user 100 is engaged are sent to the server 80 in a particular format that is readily understood by the processor 30 on the game/device partner 10. In other embodiments, an over the top application 52 is not necessary and the device 50 itself can output triggers to the server 80. Software on the server 80 can then organize and analyze the triggers and communicate this information to the game/device partner 10 for subsequent analysis and action by the processor 30 and storage on memory 32 of game/device partner 10. In another embodiment, the device 50 can communicate triggers directly to the processor 30 of the game/device partner 10 and the processor can then analyze, through AI software, that raw trigger information and provide a signal to cause at least one of the following actions: changing the eyes to a different mode (e.g., from normal eye appearance to text, or icon, or video appearance); cause an audible critique of the user's previous action; cause motors 160 to move a structural configuration of the body of the game/device partner 10; cause the microphone to sense or record information. The trigger information and resulting action can then be stored or logged into memory 32 for use by the AI in future event.

The over the top application 52 described above can provide a user interface for overlay onto game device 50.

Because the game/device partner 10 ultimately receives trigger information that was previously embedded in the software of device 50, the game/device partner 10 can be used with many different devices 50 and does not necessarily require the developers of each separate device 50 to change or modify their software for use with the game/device partner 10. Instead, the game/device partner 10 can operate with livestream devices and use software or even audio "triggers" to emote during certain events of the livestream. When the device 50 is a gaming device, certain triggers can be built into the gaming software such that game/device partner 10 can provide advice with respect to future events that may occur in the game.

The game/device partner 10 can obtain sensory information directly from device 50. However, game/device partner 10 is configured such that it is easier for processor 30 to communicate with server 80, especially when a particular gaming device 50 does not have ability to send messages to game/device partner 10 (e.g., no Bluetooth capability, etc.) In this case, the device 50 posts trigger information to server 80, and server 80 sends information to game/device partner 10. In particular, the server 80 can be configured to receive the trigger information from the gaming device via an over the top application that has already analyzed and formatted the trigger information to a certain degree. The server 80 can be configured to further analyze and/or organize and/or format the trigger information such that it is readily received and acted upon by the processor 30.

In some embodiments, a cell phone can be the gaming device 50, and can run an app associated with the game/device partner 10 to connect to the game/device partner 10 in order to send commends, connect to wifi, Bluetooth, run the game/device partner 10 like a puppet, etc.

The manner in which the game/device partner 10 communicates with the device 50 (via one way communication of triggers, for example) also provides protection of personal information belonging to the user. Game developers may not want to go through efforts to modify a game for coordination with a separate device, and also do not want to jeopardize user information (data privacy issues related to sending user specific information). The disconnect between game/device 50 and game/device partner 10 is helpful to avoid user information transmission.

Bluetooth limits range of connection between device 50 and game/device partner 10. Thus, a wifi connection between device 50 and game/device partner 10 is often used. The game/device partner 10 can be in proximity of device 50 (in audio and visual proximity)

The processor 30 includes software that includes logic that determines which response to give after a trigger is received. The memory 32 of the game/device partner 10 keeps the history of interactions with the user/game events, and uses that to influence future interactions. However, the server 80 can also influence the response by converting the game event into a different kind of command. Thus, the server 80 normalizes all of the input from the triggers produced by the device 50, and sends it to the game/device partner 10 in a common format that can readily be acted upon by the processor 30.

There are 3 ways in which the content can be triggered on the game/device partner 10: 1) Direct user interaction with the toy (such as a button press or voice input); 2) User interaction with the application (e.g., "gamebud" app), such as pressing a button which will cause the toy to tell a story; or 3) Game events sent by a game (such as getting a high score or unlocking some treasure). For 2 and 3, the commands are sent to server 80 which are then forwarded to the game/device partner 10. Server 80 converts the game events into commands which will trigger the appropriate content on the game/device partner 10.

With regard to the application programming interface (API) for device events, in the present embodiment, a game developer would write code in their game (or other software) which posts to this API when an important event has occurred, specifying the name of the event and any supplementary information (such as 'earned_coins', 'amount':20). Server 80 then forwards this to the processor 30 after mapping the event name to a content script which exists on the game/device partner 10. That content script can be dynamic to respond to the specific details and sequence of events (there is local memory 32 on the game/device partner 10 and includes a history of actions). For example, the game/device partner 10 might celebrate a user's 3rd win in a row when the game/device partner 10 receives a win event.

Communication between the server 80 and game/device partner 10 can be over the internet using the toy's WiFi connection (messages can be sent over websockets).

The game will address events to a particular game/device partner 10, by scanning for nearby Bluetooth devices. If it sees a device name which matches the expected pattern, it will address the events to that nearby game/device partner 10 when sending them to the server (this tells the server which toy to route the commands to). The benefit of this behavior is it doesn't require any pairing or sharing of the user's personal information or account ID between the game developer and the game/device partner 10.

An over the top application 52 can be used by the game/device partner 10. The over the top application 52 is an intermediate service which already collects game events from a number of different popular games. The over the top application 52 forwards game events on to server 80 so that the game/device partner 10 can respond to events in any game s associated with the over the top application 52. For that service the game/device partner 10 would likely need to be paired with the user's account associated with the over the top application 52. (Overwolf, for example, is an over the top application that a user would install on their PC and runs in the background as they play games or use an associated device).

Figure 5:
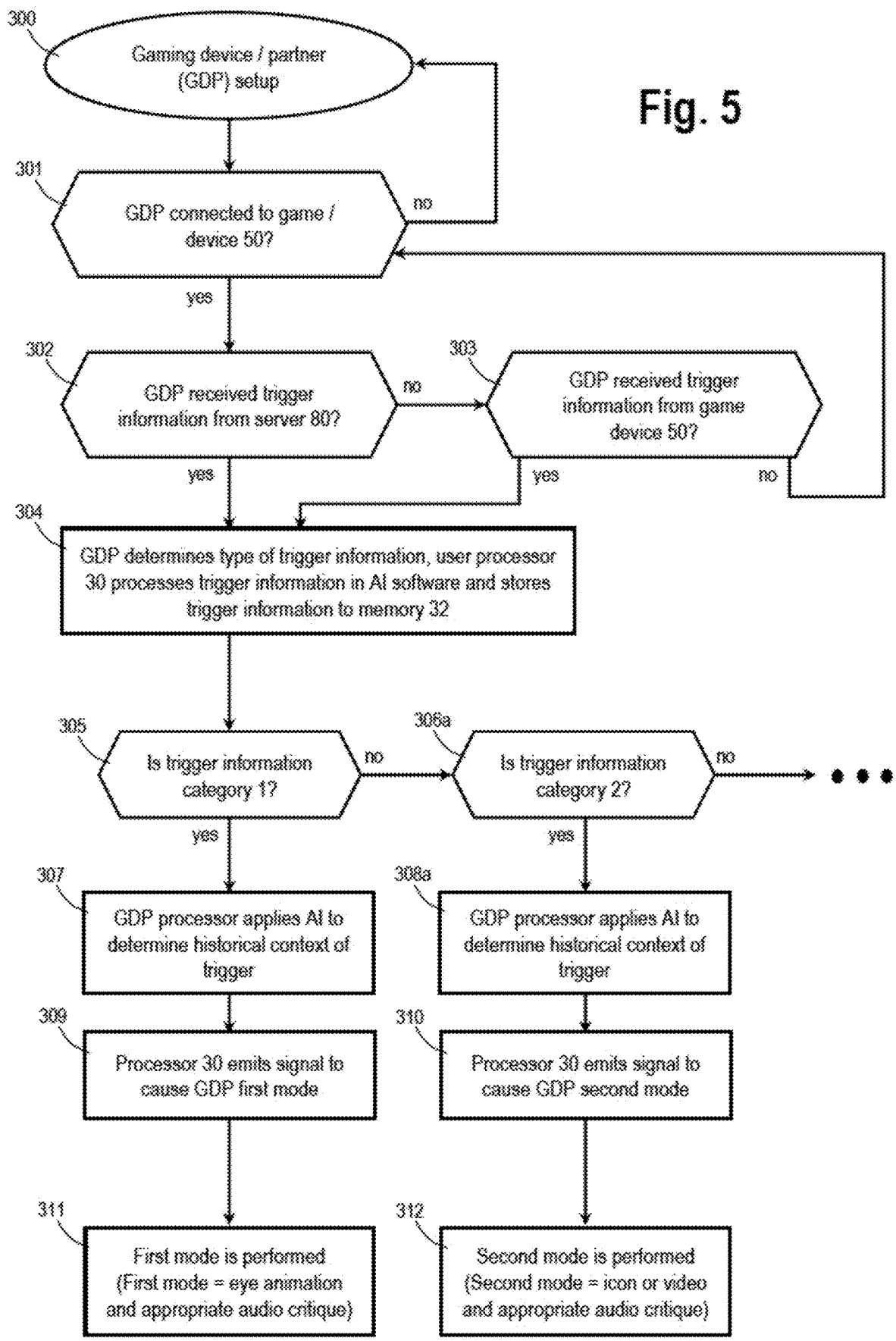
FIG. 5 is a flow chart showing the communication and logic configuration for a game/device partner made in accordance with principles of the disclosed subject matter.

FIG. 5 shows a flowchart in which game/device partner 10 goes through a set up routine at step 300. The game/device partner 10 searches for connection to a game or other device 50 in its vicinity. At step 301, the game/device partner 10 determines whether it is connected to a device 50, and if it connected, moves to step 302, and if not connected returns to step 300. Once the game/device partner 10 is connected (wired, or wirelessly via Bluetooth, wifi, or otherwise connected) to the device 50, the game/device partner 10 via processor 30 at step 302 determines whether trigger information has been received from device 50 via server 80. In an alternative embodiment, step 303 can be included where the game/device partner 10 via processor 30 determines whether trigger information has been received directly from device 50. If trigger information has been received, then at step 304 the game/device partner 10 determines the type of trigger information and processes the trigger information using AI in the processor 30 and using memory 32. The trigger information is then stored in the memory 32 for use by the AI in future trigger events. The processor 30 then determines at steps 305, 305a, . . . the type of trigger information. For example, the trigger information can be a category 1 trigger at step 307 that might be a good event that occurred for the user on the associated device 50, or can be a category 2 trigger at step 308 that might be a bad event that occurred for the user on the associated device 50, or can be any number of different category triggers associated with different emotions or goals or achievements, etc. If the trigger is a category 1 trigger, the processor 30 of the game/device partner 10 applies AI at step 307 to determine historical context of trigger based on memory 32 (similar with any number of category triggers in step 307a, 307b, and so on). At step 309, if the trigger is category 1, the processor 30 emits a signal to the game/device partner 10 to cause an action or change, such as causing the game/device partner 10 to enter a first mode at step 311 in which eyes 12 are caused to display a normal eye appearance. At step 310, if the trigger is category 2, the processor 30 emits a signal to the game/device partner 10 to cause an action or change, such as causing the game/device partner 10 to enter a second mode at step 312 in which eyes 12 are caused to display a video or icon. The action or change in each path can include movement of various structures of the game/device partner 10, audible critique or instruction via the speaker 140, or observation via the microphone 190.

Alternative Embodiments

While certain embodiments of the invention are described above, it should be understood that the invention can be embodied and configured in many different ways without departing from the spirit and scope of the invention.

In accordance with another aspect of the disclosed subject matter, an interactive talking, animatronic character gaming partner can include a softgood/plush or other material character; embedded animatronics via motors that deliver facial/head expressions and movements such as through moving eyes, eyelids, ears, mouth expressions; an accelerometer and wireless radio; a speaker and a microphone; a rechargeable battery and charging cord; a processor configured to accept voice, touch, and digital triggers in a stand-alone mode or within a gaming app to incite both audio and animatronic responses.

An accompanying digital app can be provided for set up, connection, analytics, previews, and storefront of current and future apps and products.

The immersive content described above can include audio animatronic responses in: Stand-alone mode (Wi-Fi connection); Paired via Bluetooth with a digital gaming app; Paired with other compatible consumer product.

The system described above can also include immersive content that is synchronized to a digital gaming app which feeds upcoming events through triggers, to software, in order to launch audio and predetermined animatronic sequences simultaneously. For instance, in the app game play the on-screen, the character is running and jumping over obstacles. Digital triggers embedded in the app software alert the software in the physical character to launch audio and animatronic expressions i.e., "Whoa, look out for the car coming at you! Better jump higher this time." or "Ha, you totally just missed that jump!" As the character talks, for instance, he is closing his eyes, smiling then scowling with eyebrows moving in a stern angle, then blinking looking left and opening his mouth looking like he is screaming.

The software informs the game play and the gameplay informs the software which allows to customize and advance the game playing experience. The audio animatronics of product changes based on the changing algorithm of software.

The interactive, connected, gaming partner can be embodied in a plush, or other material, stand-alone character. The character responds to audio, tactile, motion inputs, and responds with auto animatronic facial expressions. Once paired with a digital gaming app, it "rides along" as a gaming partner, responding to current and future events occurring in the game with audio animatronic expressions, comments, suggestions, and helps in creating the larger narrative of the particular game. The platform includes the plush audio animatronic character, speaker, microphone, motion switched, rechargeable battery, voice recognition software, and a processor configured to recognize variable inputs from app and game player to drive audio and animatronic responses.

The game/device partner 10 can be configured to act as a "Streamer" in which kids/adults watch other kids/adults play video games and provide critiques or commentary on their play. Thus, the game/device partner 10 can provide an emotional reaction to what gamer is doing, or provide game hints (live).

The game/device partner 10 doesn't require anticipation from game developer, and can be associated with a livestream such as a game or sports event. game/device partner 10 can use various trigger outputs to add content. Trigger does not require a back and forth . . . game/device partner 10 receives a log to keep up to date on what is happening and how to react. Events triggers are embedded in game device 50 software typically for game's analytics, and can be sent to server 80.

Game wasn't developed with anticipation of character, the game/device partner 10 is add on, and has technology that allows reaction to game.

It will be appreciated that features, elements and/or characteristics described with respect to one embodiment of the disclosure may be variously used with other embodiments of the disclosure as may be desired.

It will be appreciated that the effects of the present disclosure are not limited to the above-mentioned effects, and other effects, which are not mentioned herein, will be apparent to those in the art from the disclosure and accompanying claims.

Although the preferred embodiments of the present disclosure have been disclosed for illustrative purposes, those skilled in the art will appreciate that various modifications, additions and substitutions are possible, without departing from the scope and spirit of the disclosure and accompanying claims.

It is appreciated that the various components of embodiments of the disclosure may be made from any of a variety of materials including, for example, plastic, plastic resin, nylon, Delrin, composite material, foam, paper, rubber, wood, metal, ceramic, cement, glass, marble, natural textiles, synthetic textiles, leather and/or fibers, for example, or any other material as may be desired.

A variety of production techniques may be used to make the apparatuses as described herein. For example, suitable injection molding and other molding techniques and other manufacturing techniques might be utilized. Also, the various components of the apparatuses may be integrally formed, as may be desired, in particular when using molding construction techniques. Also, the various components of the apparatuses may be formed in pieces and connected together in some manner, such as with suitable adhesive and/or heat bonding.

The various apparatuses and components of the apparatuses, as described herein, may be provided in various sizes and/or dimensions, as desired.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present.

It will be understood that when an element or layer is referred to as being "onto" another element or layer, the element or layer can be directly on another element or layer or intervening elements or layers. Examples include "attached onto", secured onto", and "provided onto". In contrast, when an element is referred to as being "directly onto" another element or layer, there are no intervening elements or layers present. As used herein, "onto" and "on to" have been used interchangeably.

It will be understood that when an element or layer is referred to as being "attached to" another element or layer, the element or layer can be directly attached to the another element or layer or intervening elements or layers. In contrast, when an element is referred to as being "attached directly to" another element or layer, there are no intervening elements or layers present. It will be understood that such relationship also is to be understood with regard to: "secured to" versus "secured directly to"; "provided to" versus "provided directly to"; and similar language.

As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper", "top", "bottom", "left", "right" and the like, may be used herein for ease of description to describe the relationship of one element or feature to another element(s) or feature(s) as illustrated in the drawing figures. It will be understood that spatially relative terms are intended to encompass different orientations of structures in use or operation, in addition to the orientation depicted in the drawing figures. For example, if a device in the drawing figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein should be interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, as otherwise noted herein, when a particular feature, structure, or characteristic is described in connection with any embodiment, it is submitted that it is within the purview of one skilled in the art to effect and/or use such feature, structure, or characteristic in connection with other ones of the embodiments.

Embodiments are also intended to include or otherwise cover methods of using and methods of manufacturing any or all of the elements disclosed above.

As otherwise described herein, it is appreciated that a feature of one embodiment of the disclosure as described herein may be used in conjunction with features of one or more other embodiments as may be desired.

As used herein, "data" and "information" have been used interchangeably.

Any motorized structure or other mechanical structure as described herein may utilize gears, linkages, pins, sprocket with chain, supports, connectors, or other known mechanical arrangement so as to transfer requisite motion and/or energy and so as to provide support and structural integrity.

Features as disclosed herein may be described in context of particular units or dimensions. It is appreciated that alternative units or dimensions can be used as desired. Additionally, conversion can be performed between units or dimensions as may be desired.

In this disclosure, quotation marks, such as "device", have been used to enhance readability and/or to parse out a term or phrase for clarity.

Hereinafter, further aspects of implementation of the systems and methods of the disclosure will be described.

As described herein, at least some embodiments of the system of the disclosure and various processes, of embodiments, are described as being performed by one or more computer processors, i.e., one or more processors. Such one or more computer processors may be in the form of a "processing machine," i.e., a tangibly embodied machine. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be described as a program, software program, code or simply software.

As noted above, the processing machine, which may be constituted, for example, by the particular system and/or systems described above, can execute the instructions that are stored in the memory or memories to process data. This processing of data may be in response to commands by a user or users of the processing machine, in response to previous processing, in response to a request by another processing machine and/or any other input, for example.

As noted above, the machine used to implement the disclosure may be in the form of a processing machine. The processing machine may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices, or apparatus that is capable of implementing the steps of the processes of the disclosure.

The processing machine used to implement the disclosure may utilize a suitable operating system. Thus, embodiments of the disclosure may include a processing machine running Windows 10, Windows 8, Microsoft Windows Vista, Microsoft Windows XP, Microsoft Windows NT, Windows 2000, Unix, Linux, Xenix, IBM AIX, Hewlett-Packard UX, Novell Netware, Sun Microsystems Solaris, OS/2, the BeOS, Macintosh, Apache, OpenStep, Google Android OS, Apple macOS, Apple iOS and/or another operating system or platform.

It is appreciated that in order to practice the method of the disclosure as described above, it is not necessary that the processors and/or the memories of the processing machine be physically located in the same geographical place. However, when describing a one device, such as a processor, as separate from another device, such as a server, the physical location is different in that there is no physical structural connections between the devices and there is significant geographic distance between the devices such that communications occur via Wifi, cell, or other wireless protocol or extended network system. Each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above can be performed by various components and various memories. However, it is appreciated that the processing performed by two distinct components as described above may, in accordance with a further embodiment of the disclosure, be performed by a single component. Further, the processing performed by one distinct component as described above may be performed by two distinct components. In a similar manner, the memory storage performed by multiple distinct memory portions as described above may, in accordance with a further embodiment of the disclosure, be performed by a single memory portion. Further, the memory storage performed by one distinct memory portion as described above may be performed by two memory portions.

In various processing described herein, variables can be used in various processes. Such processes can include routines, subroutines, and steps, for example. The various variables can be passed between processes as may be needed in accord with the instructions provided to the particular processor. The one or more processors can be described as a processor or as an apparatus computer processor (ACP). The various variables can be global variables that are available to the various processes and processors, such as between a calling process and a subroutine, for example.

Various technologies may be used to provide communication between the various processors and/or memories of the disclosure, as well as to allow the processors and/or the memories of the disclosure to communicate with any other entity or component, i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

A set of instructions can be used, in the processing as described herein, on a processing machine, for example. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of apparatus of the disclosure may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, can be converted to machine language using a compiler, assembler or interpreter. The machine language is binary coded machine instructions that are specific to a particular type of processing machine, i.e., to a particular type of computer, for example. The computer or processor understands the machine language.

A suitable programming language may be used in accordance with the various embodiments of the disclosure. Illustratively, the programming language used may include an assembly language, Ada, APL, Basic, C, C++, COBOL, dBase, Forth, Fortran, Java, Modula-2, Pascal, Prolog, REXX, Visual Basic, JavaScript, Swift, Scala, Go, Python, Elm, Ruby, C#, and/or Rust, for example. Further, it is not necessary that a single type of instructions or single programming language be utilized in conjunction with the operation of the systems and methods of the disclosure. Rather, any number of different programming languages may be utilized as is necessary or desirable.

Also, the instructions and/or data used in the practice of the disclosure may utilize any compression or encryption technique or algorithm, as may be desired. An encryption module might be used to encrypt data. Further, files or other data may be decrypted using a suitable decryption module, for example.

As described above, the disclosure may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in practice of the disclosure may take on any of a variety of physical forms or transmissions, for example. Illustratively, as also described above, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the disclosure.

Further, the memory or memories used in the processing machine that implements the disclosure may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods of the disclosure, a variety of "user interfaces" may be utilized to allow a user to interface with the processing machine or machines that are used to implement the disclosure. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton, a light, a set of lights, or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the systems and methods of the disclosure, it is not necessary that a human user actually interact with a user interface used by the processing machine of the disclosure. Rather, it is also contemplated that the user interface of an apparatus of the disclosure might interact, i.e., convey and receive information, with another processing machine, rather than a human user. Accordingly, the other processing machine might be described as a user. Further, it is contemplated that a user interface utilized in the systems and methods of the disclosure may interact partially with another processing machine or processing machines, while also interacting partially with a human user.

All documents referenced herein are hereby incorporated by reference in their entirety.

It will be readily understood by those persons skilled in the art that the present disclosure is susceptible to broad utility and application. Many embodiments and adaptations of the present disclosure other than those herein described, as well as many variations, modifications and equivalent arrangements, will be apparent from or reasonably suggested by the present disclosure and foregoing description thereof, without departing from the substance or scope of the disclosure.

Accordingly, while the present disclosure has been described here in detail in relation to its exemplary embodiments, it is to be understood that this disclosure is only illustrative and exemplary of the present disclosure and is made to provide an enabling disclosure. Accordingly, the foregoing disclosure is not intended to be construed or to limit the present disclosure or otherwise to exclude any other such embodiments, adaptations, variations, modifications and equivalent arrangements.

What is claimed is:

1. An interactive animatronic character gaming partner, comprising:
    a body including a head shaped portion;
    at least one display unit located at the head shaped portion and configured to resemble an eye of the interactive animatronic character gaming partner;
    at least one motor located in the body and configured to move a portion of the head shaped portion to change a structural configuration of the head shaped portion in order to emulate an emotional characteristic for the interactive animatronic character gaming partner;
    at least one speaker located adjacent the body;
    at least one microphone located adjacent the body;
    a processor located adjacent the body and configured to receive trigger information from a gaming device on which a user is playing a game, the processor also configured to output a signal to at least one of the display unit, the motor, the speaker, and the microphone in coordination with the trigger information such that the user receives information related to the game in real time based on the signal to the at least one of the display unit, the motor, the speaker, and the microphone, and
    a memory that includes a log of past actions by the user, wherein the processor is configured to, based on a past action taken by the user, provide an audible critique of the past action to the user.

2. The interactive animatronic character gaming partner of claim 1, wherein the processor is configured to cause the display unit to emit in one of a first mode and a second mode, wherein,
    when in the first mode an image of an eye in various states of emotion is displayed by the display unit, and
    when in the second mode an informational message in the form of at least one of a text character, an icon character, and video is displayed by the display unit.

3. The interactive animatronic character gaming partner of claim 1, wherein the processor is configured to obtain information from the gaming device related to a current action of the user and, based on that current action, provide audible advice related to an upcoming event in the game.

4. The interactive animatronic character gaming partner of claim 1, wherein the processor is connected to a switch that allows the user to select between an advisor mode and a streamer mode, and
    when in the advisor mode, the processor is configured to obtain information from the gaming device related to a current action of the user and, based on that current action and trigger information, provide audible advice related to an upcoming event in the game; and
    when in the streamer mode, the processor is configured to obtain information from the gaming device related to a past action of the user and, based on that past action, provide an audible critique of the past action to the user, wherein
    the switch is built into software of an application associated with the interactive animatronic character gaming partner.

5. The interactive animatronic character gaming partner of claim 1, further comprising:
    a server separate from the gaming device and configured to receive the trigger information from the gaming device, wherein the processor is configured to obtain the trigger information from the server.

6. The interactive animatronic character gaming partner of claim 5, wherein the server is configured to receive the trigger information from the gaming device via an over the top application, and is configured to send the trigger information to the processor in a format that is readily usable by the processor.

7. The interactive animatronic character gaming partner of claim 1, further comprising:
    an accelerometer located adjacent the body; and
    a rechargeable battery located adjacent the body.

8. The interactive animatronic character gaming partner of claim 1, wherein the processor is configured to accept voice, touch, and digital triggers in a stand-alone mode to incite both audio and animatronic responses.

9. The interactive animatronic character gaming partner of claim 1, wherein the at least one display unit includes a first LCD panel and a second LCD panel located at the head shaped portion and each configured to resemble an eye of the interactive animatronic character gaming partner.

10. The interactive animatronic character gaming partner of claim 1, wherein the processor is configured to connect to at least one of a mobile gaming device and a personal computer gaming device.

11. The interactive animatronic character gaming partner of claim 1, further comprising a headphone, wherein the at least one speaker and the at least one microphone are located on at least one of the headphone and the gaming device.

12. A method for operating an interactive animatronic character gaming partner, comprising:
    providing an animatronic body including a head shaped portion having at least one display unit located at the head shaped portion and configured to resemble an eye of the interactive animatronic character gaming partner, and at least one motor located in the body and configured to move a portion of the head shaped portion to change a structural configuration of the head shaped portion in order to emulate an emotional characteristic for the interactive animatronic character gaming partner, and a processor located adjacent the body and configured to obtain information from a gaming device on which a user is playing a game;
    causing the processor to receive trigger information from at least one of the gaming device and a separate server, related to an event occurring in the game;
    changing at least one of,
        a structural configuration of the head shaped portion,
        a display from the display unit, and
        an audible message from a speaker based on the trigger information received by the processor from at least one of the gaming device and the separate server, wherein the processor includes artificial intelligence software that saves information specific to actions taken by the user after a first trigger information is received;

receiving the first trigger information;

causing the gaming partner to emit a first response;

receiving a second trigger information that is identical to the first trigger information;

causing the gaming partner to emit a second response that is different from the first response based on the actions taken by the user after the first trigger information.

13. The method for operating an interactive animatronic character gaming partner according to claim 12, wherein the step of changing is based solely on the trigger information received from the at least one of the gaming device and the server, and without further back and forth communication between the processor and the at least one of the gaming device and the server, such that the interactive animatronic character gaming partner operates autonomously with respect to software being used by the gaming device except for the trigger information.

14. The method for operating an interactive animatronic character gaming partner according to claim 12, providing the audible message from the speaker such that the user receives commentary related to an action previously taken by the user in the game that the user is playing.

15. The method for operating an interactive animatronic character gaming partner according to claim 12, wherein changing includes changing the display to emit in one of a first mode and a second mode, wherein, when in the first mode an image of an eye in various states of emotion is displayed by the display unit, and when in the second mode an informational message in the form of at least one of a text character, an icon character, and video is displayed by the display unit.

16. The method for operating an interactive animatronic character gaming partner according to claim 12, wherein causing the processor to receive trigger information includes causing the processor to receive trigger information from the separate server and not from the gaming device.

17. An interactive animatronic character device partner, comprising:

a body including a head shaped portion;

at least one motor located in the body and configured to move a portion of the head shaped portion to change a structural configuration of the head shaped portion;

at least one speaker located adjacent the body;

a processor located adjacent the body and configured to interact with a device being used by a user, the processor also configured to receive trigger information from a server that is separate from and configured to communicate with the device, and to output a signal to at least one of the motor and the speaker in coordination with both the trigger information and information related to a first action by the user on the device, such that the gaming partner provides a critique of the first action to the user.

18. The interactive animatronic character device partner of claim 17, further comprising:

at least one display unit located at the head shaped portion and configured to resemble an eye of the interactive animatronic character gaming partner;

wherein the processor is configured to cause the display unit to emit in one of a first mode and a second mode, wherein, when in the first mode an image of an eye in various states of emotion is displayed by the display unit, and when in the second mode an informational message in the form of at least one of a text character, an icon character, and video is displayed by the display unit.

* * * * *